UNITED STATES PATENT OFFICE.

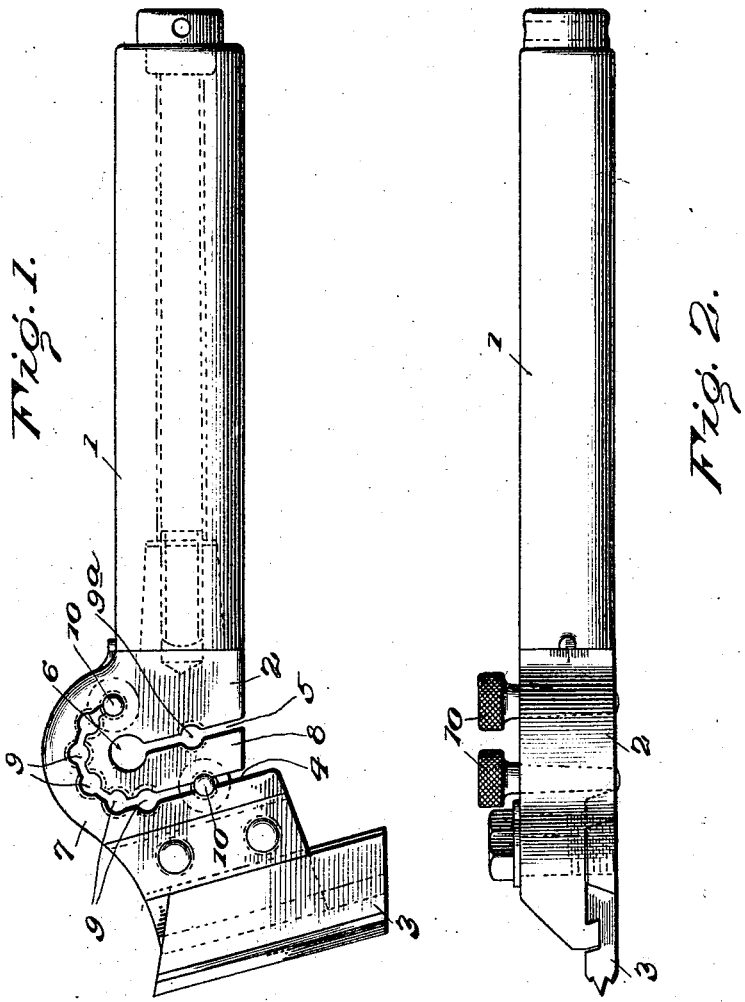

ERNST AUGUST JOHANSSON, OF STRANGNAS, SWEDEN.

TOOL HOLDER.

1,416,832.  Specification of Letters Patent.  Patented May 23, 1922.

Application filed October 2, 1920. Serial No. 414,359.

*To all whom it may concern:*

Be it known that I, ERNST AUGUST JOHANSSON, a subject of the King of Sweden, residing at Strangnas, in the Kingdom of Sweden, have invented certain new and useful Improvements in Tool Holders; and I do hereby declare the following to be a full, clear, and exact description of the invention, such as will enable others skilled in the art to which it appertains to make and use the same.

This invention relates to cutting tools and particularly to cutters designed to be used on engine lathes.

In certain kinds of lathe work, and more particularly in certain screw cutting or chasing operations done on lathes, it is of great importance that the cutting tool have a certain amount of flexibility, or elastic yielding capacity, in order to avoid raggedness and inaccuracy of the threads being cut. To this end cutter holders and cutters for lathes have been hitherto contrived whereby to obtain a certain elastic or yielding action of the cutting bit or tool, and also whereby to provide adjustment for different degrees of elastic resistance.

This invention comprises a new, simple and inexpensive holder of the general type described and having a similar object in view. It is particularly distinguished from devices previously known in that the cutter is supported by an elastic shank that is spaced from an abutment, said elastic shank and abutment having a series of seats extending along the slot whereby one or more wedges, pins or bolts may be fitted in the seats between the abutment and the elastic shank in order to adjust or vary the degree of spring action in accordance with the requirement of the work to be done.

In the accompanying drawing:

Figure 1 is a side elevation of my improved tool;

Figure 2 is a plan view of said improved tool.

In the particular embodiment of the invention illustrated in the drawing the tool is composed of three parts, to wit, a shank 1, an elastic head 2 and a cutting bit or tool 3; but it will be obvious that within the principle of my invention the said three parts may be integral or made as one. The shank 1 is adapted to be clamped in the ordinary tool carriage of a lathe. At the free end of elastic head 2, which is connected to end of shank 1, a seat is provided for the bit or cutter 3 which is shown clamped to the head by conventional means.

The head 2, in the embodiment illustrated, is provided with two slots or kerfs 4 and 5. Considering the tool as held in normal working position in a lathe, these slots or kerfs open at the under side of said head 2, and their walls are perpendicular to the opposite side faces of said head. The slot 5 extends parallel with the front edge of the cutter or bit 3, or substantially parallel with the direction of thrust between work and cutter when in operation. Slot 5 terminates in a round hole 6. Slot 4 extends parallel with slot 5 for substantially the length of the latter and then curves or arches over the hole 6, said slot 4 terminating on the opposite side of said hole,—the side toward the shank 1. The head 2 is made of elastic material such as steel. Force applied to the cutting point of cutter 3 tends to close the slot 4, the portion 7 of the head 2 to which the cutter is secured constituting a spring or elastic shank. The portion 8 between the said slots 4 and 5 is also an elastic member, but is adapted to serve either as a stiffening spring in cooperation with the shank 7, or as a rigid abutment to prevent yielding of said shank 7, as will be presently explained.

Along the slot or kerf 4, at intervals, are seats 9, and at a point between the ends of slot 5 is a seat $9^a$. These seats are formed symmetrically, one half in the material of the head at each side of the slot and are preferably conical. A filling device such as a wedge or pin 10 may be inserted in any one of the seats 9 or $9^a$, or two or more pins or other filling devices, two by preference, may be used in combination, in order to vary the degree of elastic resistance to the thrust of the work upon the cutter.

It will be apparent that when a pin 10 is wedged in seat $9^a$ of slot 5, and another pin 10 is wedged in the seat 9 nearest seat $9^a$, that the head 2 will be a substantially rigid structure. It will also be apparent that if pin 10 be removed from said seat $9^a$ and the other pin 10 remain in said seat 9, that the two elastic members 7 and 8 will act substantially as one stiff spring. By removing pin 10 from said seat 9 in slot 4 flexible elastic resistance is provided for, and this resistance may be varied by inserting a pin in different seats, as will be obvious. It will be clear from what has been described that by this improved construction the degree of stiffness of the elastic cutter support may be regulated or varied to a nicety, within wide limits, by different combinations of wedge pins and seats. Although I prefer to use conical pins and seats for purposes of varying the tension of the elastic cutter, in principle any form of filling device may be inserted in the slots for the purpose described.

Having described my invention in such manner as to enable those skilled in the art to which it appertains to make and use the same, what I claim and desire to secure by Letters Patent of the United States is:

1. A tool of the class described comprising a cutter supporting member of elastic material having a transverse open ended slot extending a distance from its open end substantially parallel with the direction of the working thrust of the cutter and then arching away from the cutter, and seats for a filling device spaced apart along said slot.

2. A tool of the class described comprising a cutter supporting member of elastic material having two open ended slots, forming two elastic members, in combination with a filling device adapted to be inserted in the slot between said elastic members.

3. A tool of the class described comprising a cutter supporting member of elastic material having two open ended slots of unequal length, one of said slots curving over the closed end of the other, the upper surface of the supporting member having a surface curved substantially parallel with the curved portion of said slot, there being formed by the said slots two elastic members, seats formed in the opposite walls of said slots for the reception of filling devices whereby to vary the degree of elasticity of the holder.

In testimony whereof I affix my signature.

ERNST AUGUST JOHANSSON.